No. 659,125. Patented Oct. 2, 1900.
C. BOENTGEN.
COMBINATION REAMER, TAP, AND COUNTERSINK.
(Application filed Mar. 22, 1900.)

(No Model.)

WITNESSES:
Jos. A. Ryan
Amos W. Hart

INVENTOR
Carl Boentgen
BY Munn & Co.

ATTORNEYS

UNITED STATES PATENT OFFICE.

CARL BOENTGEN, OF ASTORIA, OREGON.

COMBINATION REAMER, TAP, AND COUNTERSINK.

SPECIFICATION forming part of Letters Patent No. 659,125, dated October 2, 1900.

Application filed March 22, 1900. Serial No. 9,823. (No model.)

*To all whom it may concern:*

Be it known that I, CARL BOENTGEN, a resident of the city of Astoria, in the county of Clatsop and State of Oregon, have invented an Improvement in a Combination Reamer, Tap, and Countersink, of which the following is a specification.

My invention is an improvement in tools for boring and reaming bung-holes in casks and threading the edges of the same to adapt them for the reception of screw-threaded bushings having a lateral circumferential flange.

My invention is embodied in two separable parts or tools, which are constructed and adapted to be used separately and also coöperatively, so that one serves as a pivot-post or guide for the other while the countersink is being formed.

The construction, combination, and operation of the various parts are as hereinafter described and claimed, reference being had to the drawings, in which—

Figure 3:
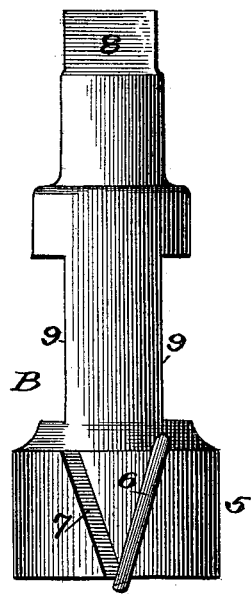
Figure 1:
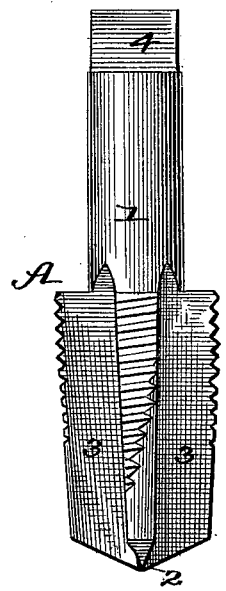
Figure 5:
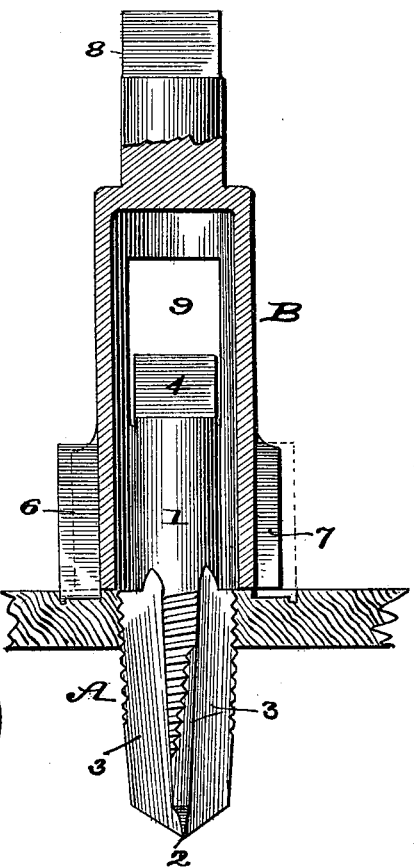
Figure 4:
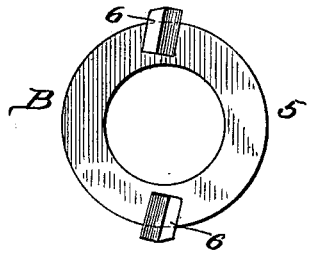
Figure 2:
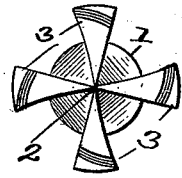

Figure 1 is a side view of the boring and reaming tool. Fig. 2 is an end view of the same. Fig. 3 is a side view of the countersinking-tool. Fig. 4 is an end view of the same. Fig. 5 is a longitudinal section showing both tools in operative relation as in use.

A indicates the boring, reaming, and screw-threaded tool, and B the countersinking-tool, the two being adapted to be used separately, in succession, and also to coöperate when the countersink is being formed, as will be hereinafter described. The tool A has a cylindrical shank 1 and a conical boring-point 2. The portion employed for reaming and screw-threading consists of four parts 3, which are provided in their lower portions with cutting edges and in their upper portions are screw-threaded, as shown in Fig. 1. The upper end 4 of this tool is squared to adapt it for application to a wrench or other tool required for rotating it.

The countersink-tool B (see Figs. 3 and 4) has an enlarged lower portion 5, which is provided on opposite sides with a cutter 6, which is set at a slight inclination, and an adjacent groove 7, which is inclined in an opposite direction, as shown in Fig. 3. The cutter 6 forms the countersink, as shown in Fig. 5, and the groove 7 receives the shavings from the cutter 6. The body of the tool B has a longitudinal cylindrical bore, as indicated at Fig. 5, the same being adapted to receive the cylindrical shank 1 of the boring-tool A. The upper end of the tool B has a squared portion 8 for the application of a tool for rotating it. The two opposite sides of the tool B are cut away, as shown at 9, to economize material and save weight.

The practical use of the invention is as follows: A wrench or other tool being applied to the part 4 of tool A, a hole is quickly bored in a selected stave of the cask in which the bung-hole is to be formed. When the tool A has been inserted far enough to thread the hole, as shown in Fig. 5, the said tool is left standing. The countersink-tool B is then applied to it, as shown in Fig. 5, whereby the cylindrical shank 1 of tool A serves as a pivot-post, around which the tool B is rotated for producing the countersink required to accommodate the flange of the screw-bushing. When said countersink has been formed to the required depth, the tool B is removed, and then the tool A is screwed out of the hole. It is apparent that while the two tools A and B may be thus used consecutively and coöperatively the tool A may be employed alone in any case in which a countersink is not required.

Having thus fully described my invention, what I claim as new, and desire to secure by Letters Patent of the United States, is—

The combination, with a boring or reaming tool having a shank shaped in part for engagement with a rotating means and also having a cylindrical portion, of a secondary or countersink cutter recessed to receive and be capable of rotating upon the cylindrical portion of said tool-shank, and also having a portion adapted to be engaged by a rotating means, the whole so arranged that the boring-tool may be left in position in the hole it bores and forming a spindle or pivot upon which the secondary cutter may be rotated, substantially as described.

In witness whereof I have hereunto set my hand this 28th day of February, 1900.

CARL BOENTGEN.

In presence of—
   J. P. C. UPSHUR,
   JOHN H. SMITH.